US007008324B1

(12) United States Patent
Johnson et al.

(10) Patent No.: US 7,008,324 B1
(45) Date of Patent: Mar. 7, 2006

(54) GAMING DEVICE VIDEO DISPLAY SYSTEM

(75) Inventors: Brad W. Johnson, Henderson, NV (US); Vaughn Place, Henderson, NV (US)

(73) Assignee: Paltronics, Inc., The Lake in the Hill, IL (US)

( * ) Notice: Subject to any disclaimer, the term of this patent is extended or adjusted under 35 U.S.C. 154(b) by 0 days.

(21) Appl. No.: 09/397,910

(22) Filed: Sep. 17, 1999

Related U.S. Application Data

(60) Provisional application No. 60/102,672, filed on Oct. 1, 1998.

(51) Int. Cl.
*A63F 13/00* (2006.01)
*A63F 9/24* (2006.01)
*G06F 17/00* (2006.01)
*G06F 19/00* (2006.01)

(52) U.S. Cl. ............................ 463/42; 463/16; 463/25; 463/30; 463/40; 345/4; 345/156; 345/204; 345/205

(58) Field of Classification Search .................... 463/1, 463/10–13, 16–22, 25–30, 37, 40–43, 46, 463/47; 700/90–92; 273/236, 237, 269, 273/274, 128.1, 139, 140, 142 B, 148 B, 273/121 B, 453, 460; 345/156, 173, 204, 345/205, 4
See application file for complete search history.

(56) References Cited

U.S. PATENT DOCUMENTS 4,339,798 A 7/1982 Hedges et al.
4,467,424 A 8/1984 Hedges et al.
4,572,509 A * 2/1986 Sitrick .......................... 463/31
4,643,425 A 2/1987 Herzenberger
4,746,981 A * 5/1988 Nadan et al. ................ 345/1.3
4,760,388 A * 7/1988 Tatsumi et al. .............. 345/1.3
4,800,376 A * 1/1989 Suga et al. .................. 345/1.3
4,856,787 A * 8/1989 Itkis ....................... 273/237 X
4,924,318 A * 5/1990 Ho ............................. 348/383
4,926,327 A 5/1990 Sidley
4,976,438 A * 12/1990 Tashiro et al. .......... 434/307 R
4,998,199 A * 3/1991 Tashiro et al. .......... 364/410 X
5,116,055 A 5/1992 Tracy
5,184,956 A * 2/1993 Langlais et al. .............. 434/69
5,242,163 A * 9/1993 Fulton ................ 273/85 CP X
5,249,800 A 10/1993 Hilgendorf et al.
5,280,909 A 1/1994 Tracy
5,288,077 A 2/1994 Jones
5,320,351 A * 6/1994 Suzuki .......................... 463/1
5,342,047 A * 8/1994 Heidel et al. ....... 273/85 CP X
5,377,973 A 1/1995 Jones et al.
5,382,025 A 1/1995 Sklansky et al.
5,396,257 A * 3/1995 Someya et al. .............. 345/1.1
5,417,430 A 5/1995 Breeding
5,467,102 A * 11/1995 Kuno et al. .................. 345/1.3

(Continued)

*Primary Examiner*—Xuan M. Thai
*Assistant Examiner*—Binh-An D. Nguyen
(74) *Attorney, Agent, or Firm*—Ian F. Burns

(57) ABSTRACT

A wagering device video display system for displaying a presentation on a plurality of display devices. A plurality of gaming devices and video displays are provided. Each video display may be controlled by a video display controller that is adapted to communicate with other video display controllers. When a multi-screen presentation is requested by a gaming device or a game device controller, the video display controllers coordinate among themselves to determine when the presentation will be displayed. Various bonus presentations or attractive presentations may be displayed on a plurality of video screens.

8 Claims, 7 Drawing Sheets

U.S. PATENT DOCUMENTS 5,472,194 A 12/1995 Breeding et al.
5,472,195 A * 12/1995 Takemoto et al. ...... 273/143 R
5,560,603 A * 10/1996 Seelig et al. ............ 273/143 R
5,564,701 A * 10/1996 Dettor ...................... 463/16 X
5,584,763 A * 12/1996 Kelly et al. ............... 463/16 X
5,611,730 A * 3/1997 Weiss ....................... 463/20 X
5,624,119 A * 4/1997 Leake .................... 273/269 X
5,639,088 A * 6/1997 Schneider et al. ... 273/138.2 X
5,655,961 A * 8/1997 Acres et al. .............. 463/27 X
5,664,998 A * 9/1997 Seelig et al. ............ 273/143 R
5,707,285 A 1/1998 Place et al.
5,741,183 A 4/1998 Acres et al.
5,743,800 A 4/1998 Huard et al.
5,762,552 A 6/1998 Vuong et al.
5,779,544 A * 7/1998 Seelig et al. ............ 273/143 R
5,788,573 A * 8/1998 Baerlocher et al. ....... 463/16 X
5,794,964 A 8/1998 Jones et al.
5,795,225 A 8/1998 Jones et al.
5,828,410 A * 10/1998 Drapeau ..................... 348/359
5,830,069 A 11/1998 Soltesz et al.
5,833,537 A * 11/1998 Barrie ......................... 463/21
5,848,932 A 12/1998 Adams
5,876,284 A 3/1999 Acres et al.
5,882,261 A 3/1999 Adams
5,911,418 A 6/1999 Adams
5,911,626 A 6/1999 McCrea, Jr.
5,913,726 A 6/1999 Jones et al.
5,934,999 A 8/1999 Valdez
5,938,200 A * 8/1999 Markowicz et al. ..... 273/138.2
5,947,821 A * 9/1999 Stone ....................... 463/13 X
5,951,009 A * 9/1999 Miyamoto et al. ...... 273/121 B
5,951,011 A 9/1999 Potter et al.
5,971,849 A * 10/1999 Falciglia .................. 463/16 X
5,986,622 A * 11/1999 Ong .......................... 345/1.1
5,997,400 A * 12/1999 Seelig et al. ............ 273/143 R
6,004,207 A 12/1999 Wilson, Jr. et al.
6,012,982 A 1/2000 Piechowiak et al.
6,015,347 A 1/2000 Maahs et al.
6,024,642 A 2/2000 Stupak
6,080,063 A 6/2000 Khosla
6,083,105 A 7/2000 Ronin et al.
6,110,043 A * 8/2000 Olsen .......................... 463/27
6,142,872 A * 11/2000 Walker et al. ................ 463/16
6,146,273 A * 11/2000 Olsen .......................... 463/27
6,210,275 B1 * 4/2001 Olsen ...................... 273/138.1
6,213,877 B1 * 4/2001 Walker et al. ............ 463/26 X
6,217,448 B1 * 4/2001 Olsen .......................... 463/25
6,224,484 B1 5/2001 Okuda et al.
6,231,442 B1 * 5/2001 Mayeroff .................. 463/20 X
6,254,481 B1 * 7/2001 Jaffe ........................... 463/20
6,262,695 B1 * 7/2001 McGowan .................. 345/1.1
6,267,669 B1 7/2001 Luciano, Jr. et al.
6,270,411 B1 8/2001 Gura et al.
6,302,395 B1 10/2001 Astaneha
6,336,857 B1 1/2002 McBride
6,346,044 B1 2/2002 McCrea, Jr.
6,379,247 B1 4/2002 Walker et al.
6,569,018 B1 5/2003 Jaffe

* cited by examiner

GAMING DEVICE VIDEO DISPLAY SYSTEM

CROSS REFERENCES TO RELATED APPLICATIONS

This application claims priority of U.S. provisional patent application Ser. No. 60/102,672, filed on Oct. 1, 1998.

BACKGROUND OF THE INVENTION

1. Field of Invention

The present invention relates to a gaming device video display system that is adapted to display an integrated presentation on a plurality of video displays.

2. Description of Related Art

Gaming devices are well known in the fields of gaming and wagering. Many different types of gaming devices have been developed with a large variety of games, themes, and displays. Most gaming devices utilize displays to present information to players. For example, a spinning reel slot machine utilizes a spinning reel display. When the reels in the display stop spinning, symbols are presented on the reels that allow players to determine the outcome of the game. Other wagering games, such as video poker and video reel games (games in which the reels are represented on video screens), utilize video displays to present game information.

In addition to having a primary display, such as those described above, some gaming devices utilize secondary displays. These secondary displays may be used in addition to the primary display to display bonus awards or to provide an entertaining presentation to attract players to the game.

It has been found that large video displays can be very effective in entertaining and attracting players. In general, the larger the video display, the more entertaining and attractive presentations on the video displays can be. Although it is desirable to provide large video displays, it is very difficult and inefficient to place large video displays in most gaming establishments. Large video displays usually take a large amount of space that would otherwise be occupied by income producing gaming devices. It is therefore desirable to minimize the amount of space occupied by display devices. To this end, it would be desirable to use video displays that are incorporated in the gaming devices.

Although gaming devices are often set side-by-side on a casino floor, the prior art has failed to link or combine the display devices on a number of gaming devices. What has long been needed is a means for combining the video displays on a number of gaming devices to present a single integrated presentation. By utilizing a plurality of video displays, it is possible to present much larger and more interesting presentations. For example, in the prior art, a video display on a single machine may be used to present an animated bonus display. However, because the display is only on one screen, the presentation is small and it can only be seen by the player and those standing immediately behind the player. If video displays on several gaming devices are used to display the presentation, it is possible to view the presentation from across the room. Therefore, more people see the display and more people are attracted to the gaming devices.

SUMMARY OF INVENTION

The present invention comprises gaming device video display system for displaying multi-screen presentations. The system comprises a plurality of gaming devices, a plurality of video displays, and a plurality of display controllers.

Each gaming device is adapted to allow a player to place wagers and play a wagering game. In addition, each gaming device is adapted to select a multi-screen presentation and transmit a request for a multi-screen presentation.

The plurality of video displays are positioned in close relative proximity to allow a video presentation to be displayed using the plurality of video displays. Each video display is adapted to display a video presentation, a portion of the video presentation being displayed on each of the video displays.

Each video display controller is in communication with a gaming device, a video display, and other video display controllers. Each video display is adapted to receive requests for multi-screen presentations from the gaming device with which it is in communication and adapted to operate the video display with which it is in communication to present a portion of a multi-screen presentation. The video display controllers being adapted to coordinate multi-screen presentations among the video display controllers.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

System

Figure 1:
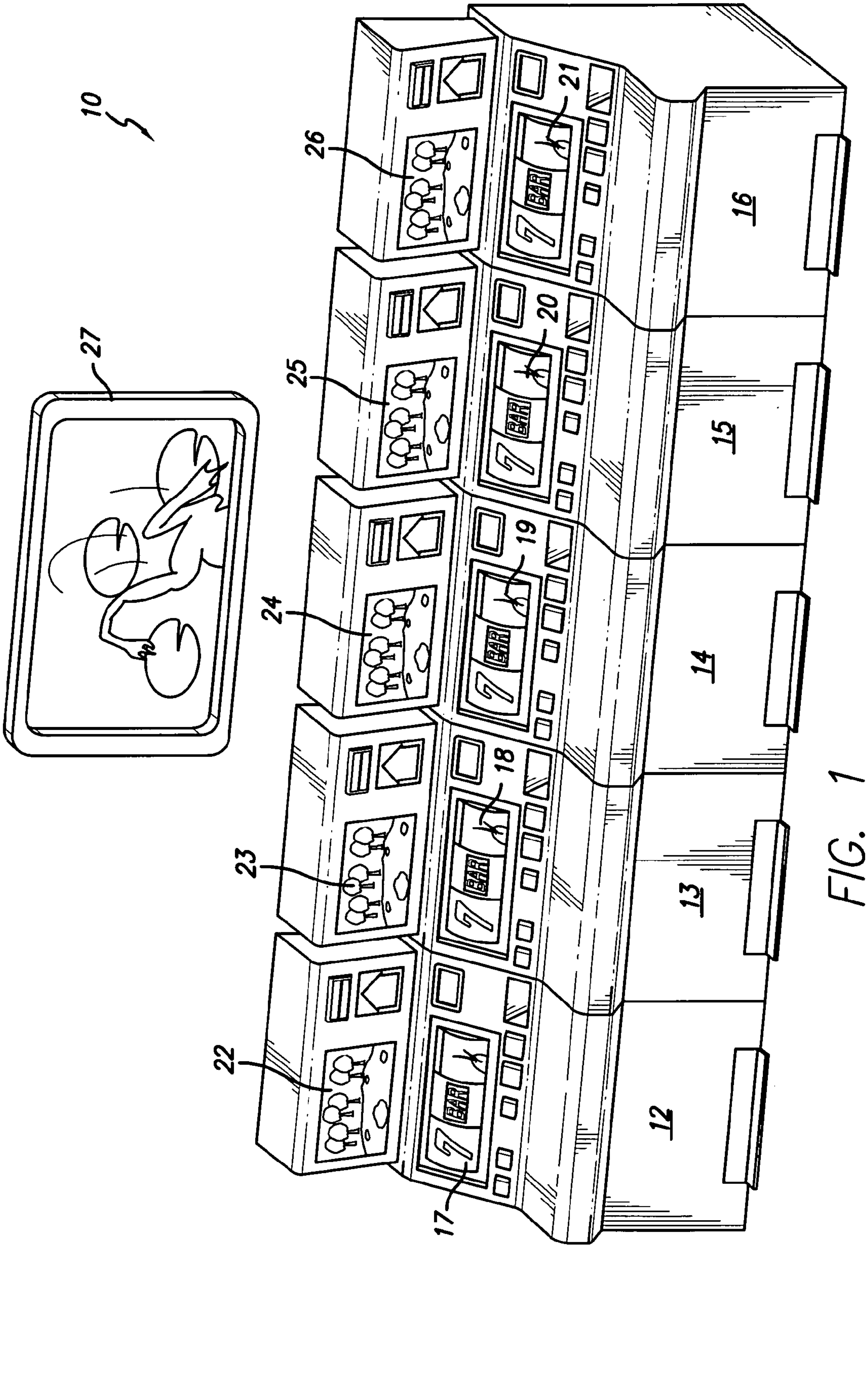
FIG. 1 is substantially an isometric view of the one embodiment of the system of the present invention.

As seen in FIG. 1, the present invention comprises a gaming device video display system generally indicated by reference number 10. System 10 comprises a plurality of gaming or wagering devices 12–16. In the preferred embodiment, five separate gaming devices 12–16 are used. However, a greater or less number may be utilized and still achieve the objects of the present invention. Preferably, gaming devices 12–16 are placed in a side-by-side arrangement so that video display 22–26 are close enough together to provide an integrated presentation to an observer.

Each gaming device 12–16 is adapted to operate a game. Many different types of games may be used with the present invention. For example, the game may be a wagering game that requires the player to place wagers and input commands to begin the game. Each wagering device 12–16 may operate the same game, a variety of games may be provided on the different devices, or each device may offer a variety of different games.

Gaming devices 12–16 are provided with sufficient controls and features to allow players to operate the devices. For example, gaming devices 12–16 may be provided with bill and coin acceptors, card readers, dispensers, and various buttons for controlling the devices.

Gaming devices 12–16 depicted in FIG. 1 are "slant top" style slot machines. However, almost any style of gaming device that may comprise a video display may be used with the present invention.

In the preferred embodiment, each gaming device 12–16 comprises a game display 17–21. Game displays 17–21 are used primarily to display the game operated by each gaming device 12–16. Game displays 17–21 may comprise mechanical devices, video displays, lights, and other well known display devices. For example, if the game provided is a spinning reel game, game display 17–21 may be a set of mechanical reels. If the game provided is a video card game, game display 17–21 may be a video screen.

System 10 also comprises video displays 22–26. Video displays 22–26 may be any of a variety of well known display devices, such as cathode ray tubes, liquid crystal displays, or plasma displays. These devices are used to display both integrated, multi-screen presentations, as will be discussed below, and independent, single screen presentations. The video presentations displayed on displays 22–26 may be a variety of bonus presentations, a presentation to attract players to system 10, or a presentation to provide information to players.

It is recognized that gaming devices 12–16 may be adapted to utilize only one display that displays both the game and video presentations. Thus, all of the game information may be displayed on video displays 22–26 and game displays 17–21 may not be provided. It is further recognized that each gaming device 12–16 may have any combination of display devices. For example, both the game display and video display may be video devices and each display device (game display or video display) may comprise a variety of different kinds of display devices.

System 10 may also comprise a large display device 27. In the preferred embodiment, video display 27 is a large plasma video display that is placed above wagering devices 12–16. Video display 27 may be used to display all or a portion of a video presentation. As will be discussed below, the present invention provides means for utilizing both video displays 22–26 and large display device 27 for displaying a single integrated, multi-screen video presentation.

Figure 2:
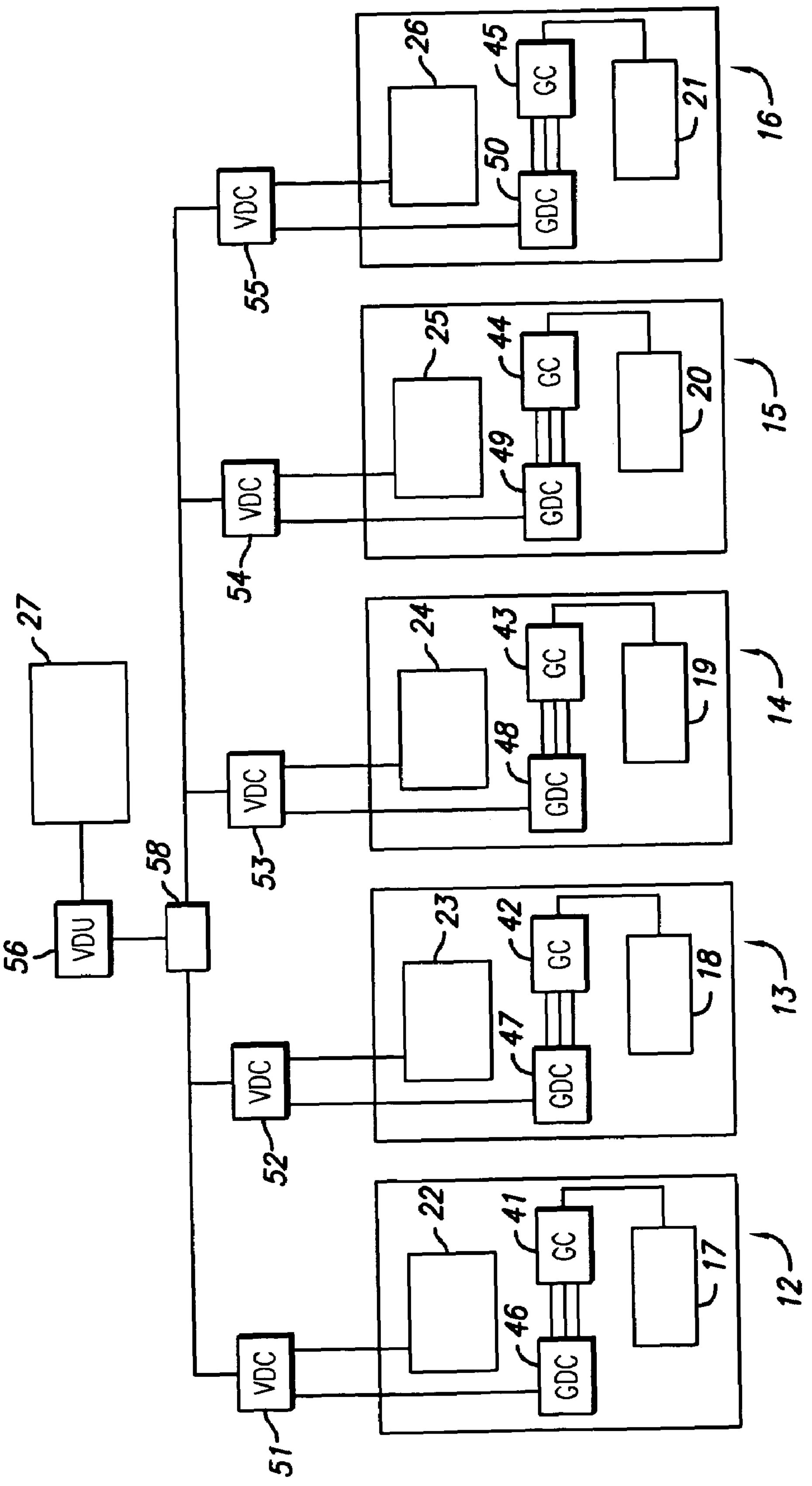
FIG. 2 is substantially a schematic representation of the system of the present invention.

In FIG. 2, system 10 is depicted in schematic form. Each gaming device 12–16 comprises a game controller 41–45 (hereinafter referred to as "GC") respectively. GCs 41–45 are adapted to operate the game or games offered on gaming devices 12–16. Input/output devices, such as buttons, bill and coin acceptors, card readers, and sensors (none of which are shown), are linked to GCs 41–45 for players to interact with the gaming devices 12–16.

When appropriate input signals are received, GCs 41–45 activate a game and produce an outcome. This may be done by generating a random number and comparing the random number to a table of outcomes. Other well known methods may also be used. When a game outcome is determined, GCs 41–45 communicate with game displays 17–21 to present the outcome of the game.

Each gaming device 12–16 comprises a gaming device controller 46–50 (hereinafter referred to as GDC). GDCs 46–50 are adapted to determine bonus awards and initiate multi-screen and single screen presentations. GDCs 46–50 may be any of a number of computer devices that are well known in the art. In the preferred embodiment, GDCs 46–50 are MHz Z!80 microprocessors with 512k erasable programmable read only memory (EPROM) and 32k of static random access memory (SRAM). GDCs 46–50 are preferably powered by the power supply on gaming devices 12–16 (between 9VDC and 12VDC) and the SRAM may have a battery backup power source for data and program security. At least two communication ports are provided, an RS232 and a RS485, and a programmable "C" interface is provided for programming GDCs 46–50.

GDCs 46–50 are linked to GCs 41–45 to exchange information between the two devices. In the preferred embodiment, a serial communication line, such as an RS232, is provided to allow GDCs 46–50 to monitor game activity (e.g., start of game, end of game, and game recall) and to request GCs 41–45 to perform certain functions (e.g., pay bonus credits). An additional communication link may be provided to allow GDCs 46–50 to monitor pulse outputs from GCs 41–45 (e.g., bonus symbols achieved, coins in, and tilt). Yet another link may be used to transmit discrete outputs form GDCs 46–50 to GCs 41–45 to request certain functions or actions be performed (e.g., assume idle mode). A communication device may also be provided that would allow GDCs 46–50 to request GCs 41–45 to present certain information on game displays 17–21 or the GDCs may communicate directly with the game displays to control the displays.

System 10 also comprises video display controllers 51–56 (hereinafter referred to as "VDCs") for generating video presentations. VDCs 51–56 may also be a large number of computer devices that are well known in the art. In the preferred embodiment VDCs 51–56 comprise Pentium II microprocessors with 64 MB or random access memory (RAM), a mass storage device, such as a hard disk drive or compact disk drive, a motion picture experts group (MPEG) II card, an Ethernet card, a sound card, and a video card. VDCs 51–55 control video displays 22–26, respectively, while VDC 56 controls video display 27. In the preferred embodiment, GDC 46–50 communicate with VDCs 51–56 via an RS485 addressable network. VDCs 51–56 communicate with each other over an ethernet network with ethernet hub 58.

Although VDCs 51–55 are shown as separate from gaming devices 12–16, it is recognized that the VDCs may be integrated into the gaming devices. Furthermore, although GCs 41–45, GDCs 46–50, and VDCs 51–55 are shown as separate devices, these devices may be integrated into a single computer device. Collectively, GCs 41–45, GDCs 46–50, and VDCs 51–55 may be called presentation controllers.

Video Presentation

Figure 3:
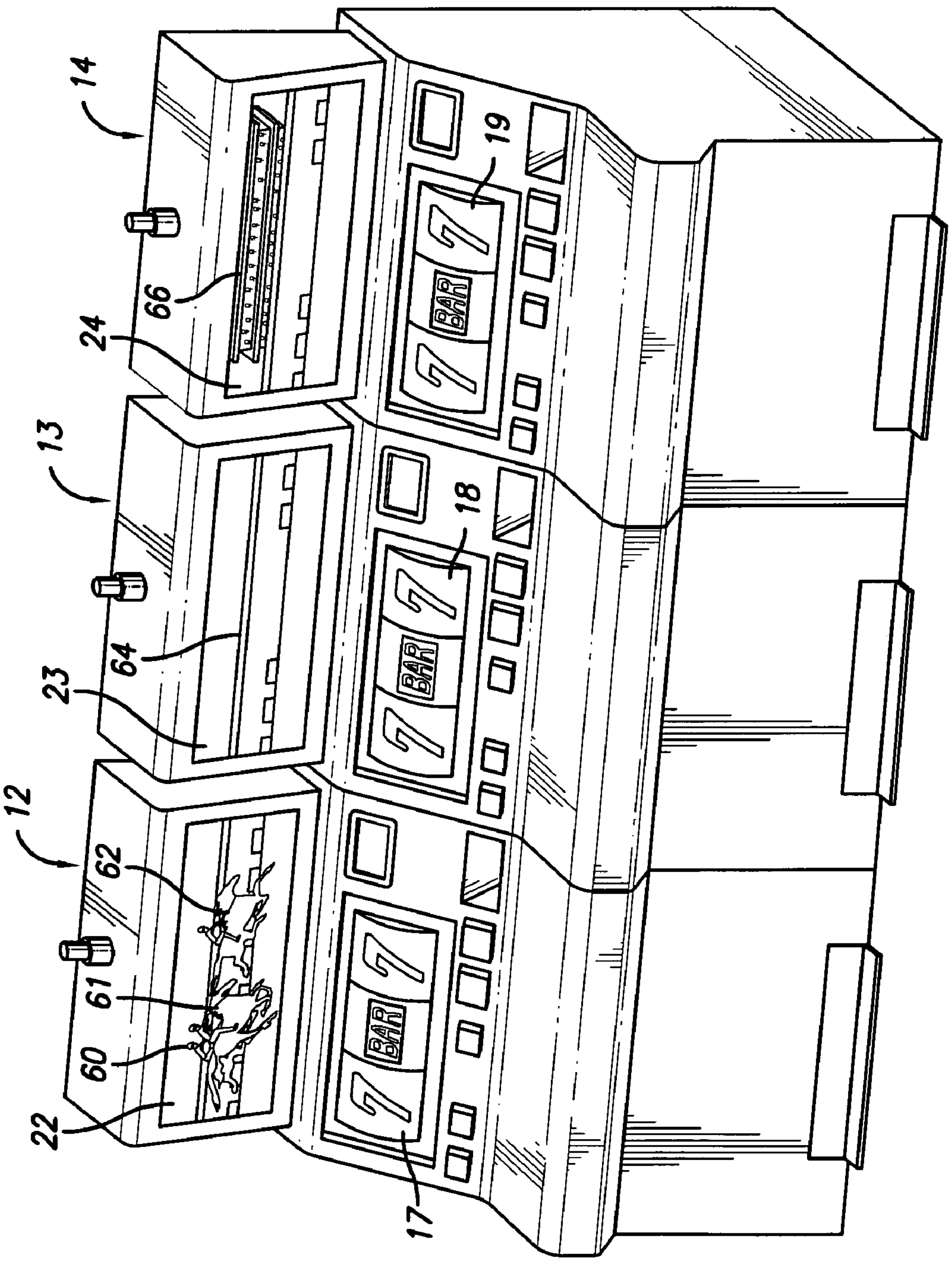
FIG. 3 is substantially a perspective view of three wagering devices of the present invention displaying a multi-screen presentation on their display devices.

The present invention is adapted to generate an integrated video presentation that utilizes a plurality of video displays in system 10. In the example depicted in FIG. 3, a horse race is shown on video displays 22–24 of gaming devices 12–14. As horses 60–62 race down the track, the horses move from video display to video display. Some features, such as fence 64, may continue across all of the screens while other features, such as grand stand 66, may be located entirely in one screen.

Multi-screen video presentations can be used for a variety of purposes. In the preferred embodiment, the video presentation is used to display bonus awards, to attract players, to present information, and to entertain players while they are playing. Some presentations may not require the use of all video displays 22–27. For example, a presentation may only require the use of large video display 27 and one of video displays 22–26 or a presentation may utilize only one game display 17–21 and one video display 22–26 on a single gaming device 12–16.

If a video presentation is used to display bonus outcomes, then a plurality of different presentations are stored in VDCs 51–55 for a particular type of bonus display. When a player qualifies for a bonus award, the player can watch the video presentation to determine the amount of the award. In the horse race embodiment, for example, three different outcomes can be presented. The bonus presentation may begin by assigning a horse to the player. The horse may be displayed on the video display 22–26 in front of the player to inform the player that this is the player's horse and that this horse determines the amount of the bonus. After the horse is assigned, the race begins and the horses run across the screens to a finish line. The finishing position (win, place, and show) of the assigned horse indicates the relative size of the bonus (largest for win, intermediate for place, and smallest for show).

Sounds may also be presented to provide a multimedia presentation. For instance, an announcer's voice and the sound of galloping horses may be played through speakers on gaming devices 12–14 to enhance the presentation. Other multimedia effects may also be used. Vibrators mounted in gaming devices 12–14 and/or chairs attached to the gaming devices, for example, may be used to create the sensation that horses are galloping by the players. As the horses enter a video screen on a gaming device, the vibrator mounted in the gaming devices may be activated to create the sensation that the horses are galloping by. The intensity of the vibrations may be gradually increased and decreased as the horses pass.

Another example of a bonus presentation, not shown, comprises a simulation of a board game. When a player qualifies for a bonus award, a game board is presented on a video display located on the player's gaming device. Animated dice or some other presentation may be used to depict how far the player's game piece will move around the game board during the particular bonus round. For example, if the dice shows a four, the player's game piece may be advanced four spaces on the game board. In fact, the movement of the game piece and the outcome of the bonus round are determined by a random number generator.

Various outcomes are achieved depending on the position of the game piece. The game piece, for instance, may land on a space that awards an instant prize to the player. Alternatively, the game piece may land on a space that initiates an animated presentation. The presentation may be a single or multi-screen presentation. The outcome of the presentation determines, from the player's point of view, how much the player will receive from the bonus round. For example, the animated presentation may show a fisherman fishing in a pond. If the fisherman lands a large fish, the player will receive a large bonus award. In this example, the fisherman may be sitting in a boat on the large video display 27 and the fish may be presented on one or more of video displays 22–26. A hook moves from video display to video display until one of the fish takes the bait. In another example, the bonus award is determined by the amount of treasure in a treasure chest that is opened by an animated treasure hunter. In yet another example, a monkey climbs a banana tree presented on large video display 27. When the monkey shakes the tree, bananas fall out of the tree and land in video displays 22–26. The number of bananas that fall on a player's screen determine the size of the bonus award. This embodiment may be used to award shared bonuses or jackpots in which multiple players receive an award. When the monkey shakes the tree, bananas fall on two or more video displays 22–26, thereby awarding a prize to multiple players.

Once the player's bonus round has been completed, the position of the player's game piece may be saved for a subsequent bonus round. In this way, the player's game piece may advance around the game board and a special bonus prize may be awarded when the game piece completes a circuit of the game board. This encourages players to continue to play the game.

Figure 4A:
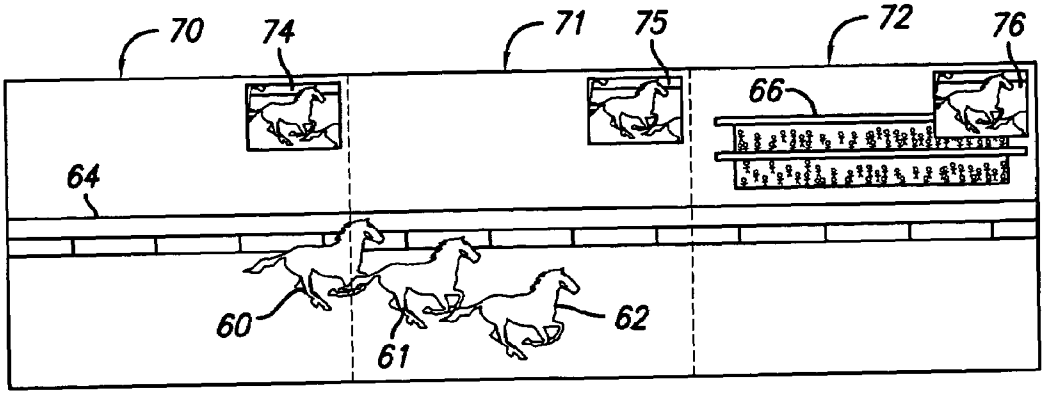
FIG. 4A is substantially a schematic representation of a multi-screen bonus presentation of the present invention divided into segments.

As seen in FIG. 4A, any integrated video presentation can be represented as a single movie or presentation. The presentation can be divided into a plurality of screen segments 70–72 that are displayed by the appropriate video display 22–24 (referring to FIG. 3). Thus, for any given time or frame of the presentation, video displays 22–24 display a segment of the overall presentation. VDCs 51–53 store the screen data and cause video displays 22–24 to display the appropriate segment at the appropriate time. When video displays 22–24 are viewed together, the presentation appears as a single integrated presentation.

Each segment or screen of data may comprise a split screen or inset portion 74–76. Split screens 74–76 may present a moving view of the entire presentation. Thus, a player may watch the entire race by looking at a split screen 74–76 and the player need not look down the row of displays. The data for split screens 74–76 may also be stored in VDCs 51–53.

Figure 4B:
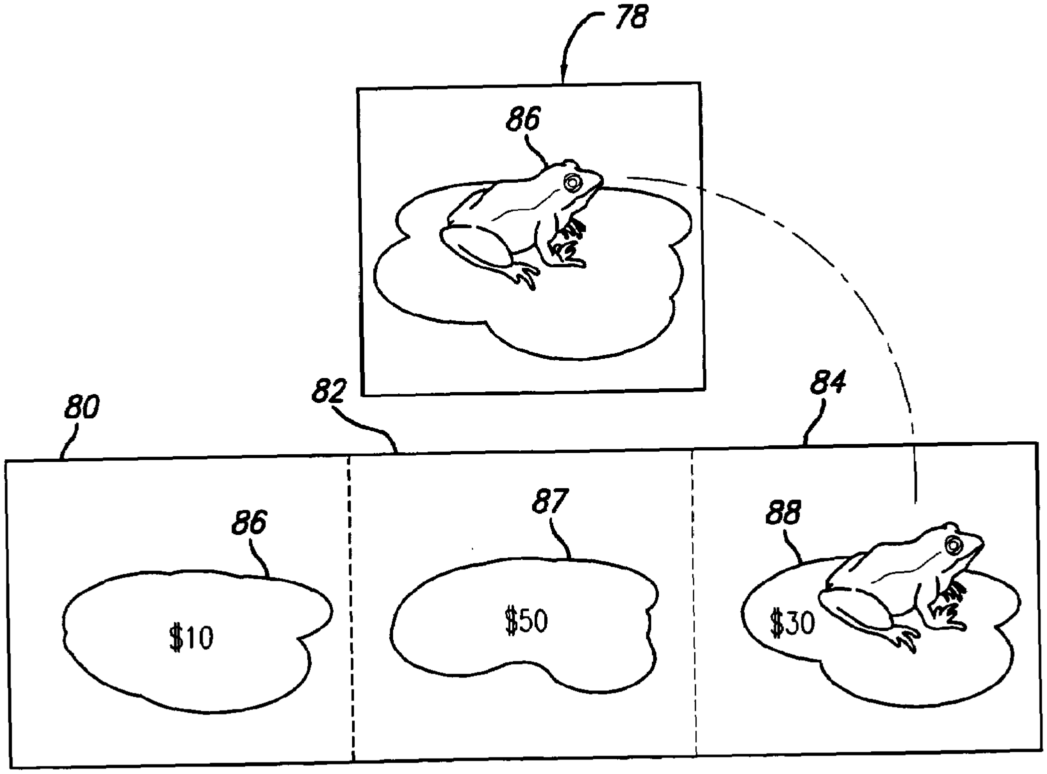
FIG. 4B is substantially a schematic representation of a multi-screen presentation of the present invention divided into segments.

An example of a presentation that may be used to attract players is illustrated in FIG. 4B. In this example, a frog 86 appears to jump from screen segment 78, which may be displayed on large video display 27, to screen segment 84. The frog may then randomly jump to an of the other screen segments 80 and 82. However, this presentation may also be used to award a prize. Each lily pad 86–88 may have prize value associated with it. Thus, if the frog jumps to lily pad 88, the player would win $30.

Figure 4C:
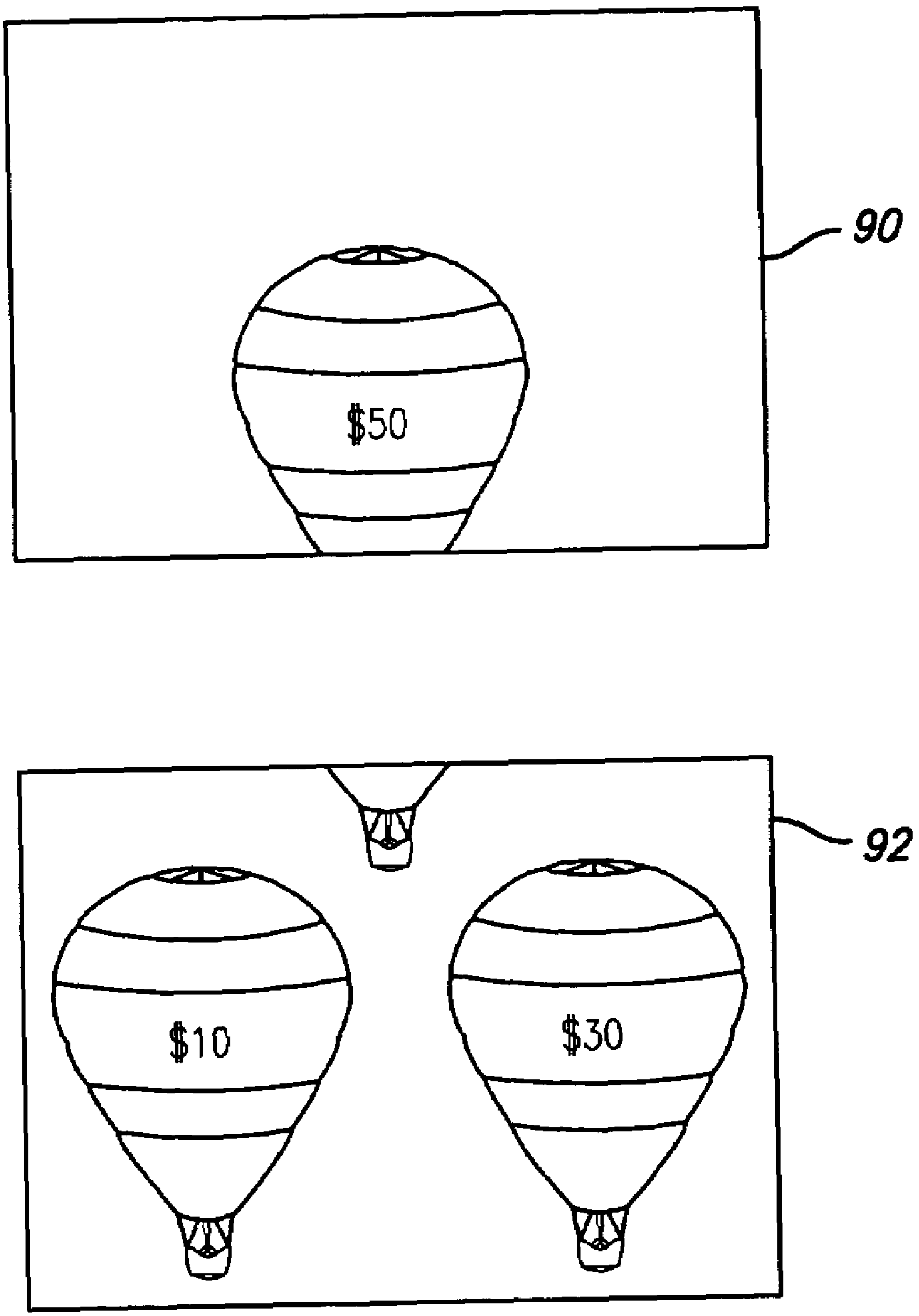
FIG. 4C is substantially a schematic representation of a two-screen presentation of the present invention divided into segments.

An example of a two-screen presentation is depicted in FIG. 4C. In this embodiment hot air balloons with different prize values race each other to the top of the display. The balloon that reaches the top of the display first is the winner and its associated value is awarded to the player. This entire multi-screen presentation may be presented on one gaming device 12–16. Screen segment 90 may be presented on one of video displays 22–26 while screen segment 92 may be presented on one of gaming displays 17–21.

It can be appreciated from the above description that an infinite variety of presentations may be displayed on the system of the present invention. The system of the present invention may be configured to any combination of presentations. The examples above serve to illustrate only a few of the possible presentations.

Method of Operation

Figure 5:
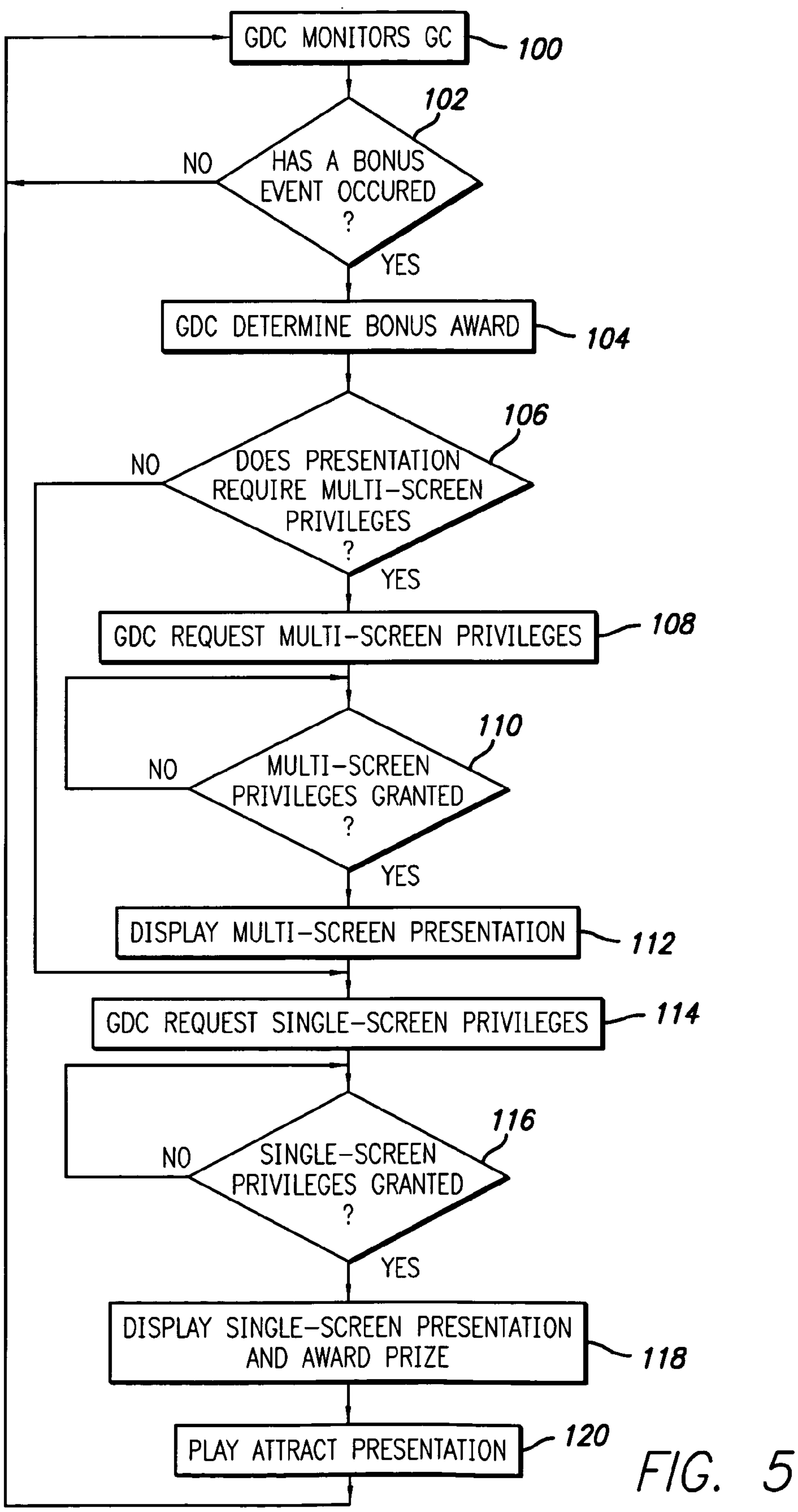
FIG. 5 is substantially a flow chart of one possible method of operation of the present invention.

FIG. 5 illustrates one possible method by which the present invention may present integrated presentations on a plurality of video displays. In the interest of clarity, the method is described for a bonus presentation with reference to GDC 46 of gaming device 12. The method begins by GDC 46 monitoring GC 41 for game play signals 100. GDC 46 continuously examines the signals to determine if a bonus event has occurred 102. GDC 46 may also be monitoring system 10 for other events. GDC 46, for instance, may be looking for an idle state (no play taking place) for a predetermined length of time, in which case the GDC may begin the procedure to play an attraction presentation intended to attract players.

A bonus event can be any predefined event or series of events. For example, a bonus event may be a predetermined outcome in the game operated by GC 41, such as a designated symbol appearing on one of the reels if the underlying game is a spinning reel game. Alternatively, a bonus event may be a number of predetermined outcomes achieved in a predetermined amount of time or in a predetermined number of games played. For instance, a bonus event may occur when a player wins five designated symbols in five minutes. A bonus event may also include events on other gaming devices. For example, a group of players may jointly qualify for a bonus award if they achieve some predefined result.

If no bonus event is detected, GDC 46 continues to monitor GC 41. If a bonus event is detected, then GDC 46 determines a bonus award 104. This is preferably performed by generating a random number within a range of numbers (e.g., between zero and one). The random number is then compared to a pay table to determine the bonus that the will be awarded. A simplified example of a pay table is provided below for the horse race bonus embodiment of the present invention:

| Random Number | Presentation | Prize Amount |
|---|---|---|
| 0.86 to 1.00 | 1 (win) | $200.00 |
| 0.51 to 0.85 | 2 (place) | $50.00 |
| 0.00 to 0.50 | 3 (show) | $10.00 |

For example, if GDC 46 generates a random number of 0.62, presentation number two would be selected and the player receives a $50.00 bonus award. Of course, many other presentations and outcomes may be available on the pay table.

Once the presentation and the outcome are determined, GDC 46 determines if the presentation selected requires multi-screen privileges 106. The outcome of this step may depend on external factors. For example, if other video displays will be busy for a predefined period, GDC 46 may be programmed to play a single screen presentation rather than have the player.

If the presentation is not a multi-screen presentation, then GDC 46 may display a single screen presentation 114. If the presentation does require multi-screen privileges, GDC 46 may transmit a signal to VDC 51 that requests multi-screen privileges 108. VDC 51 may then transmit a signal to a master VDC to request multi-screen privileges and GDC 46 and VDC 51 wait for the multi-screen privileges to be granted 110.

Figure 6:
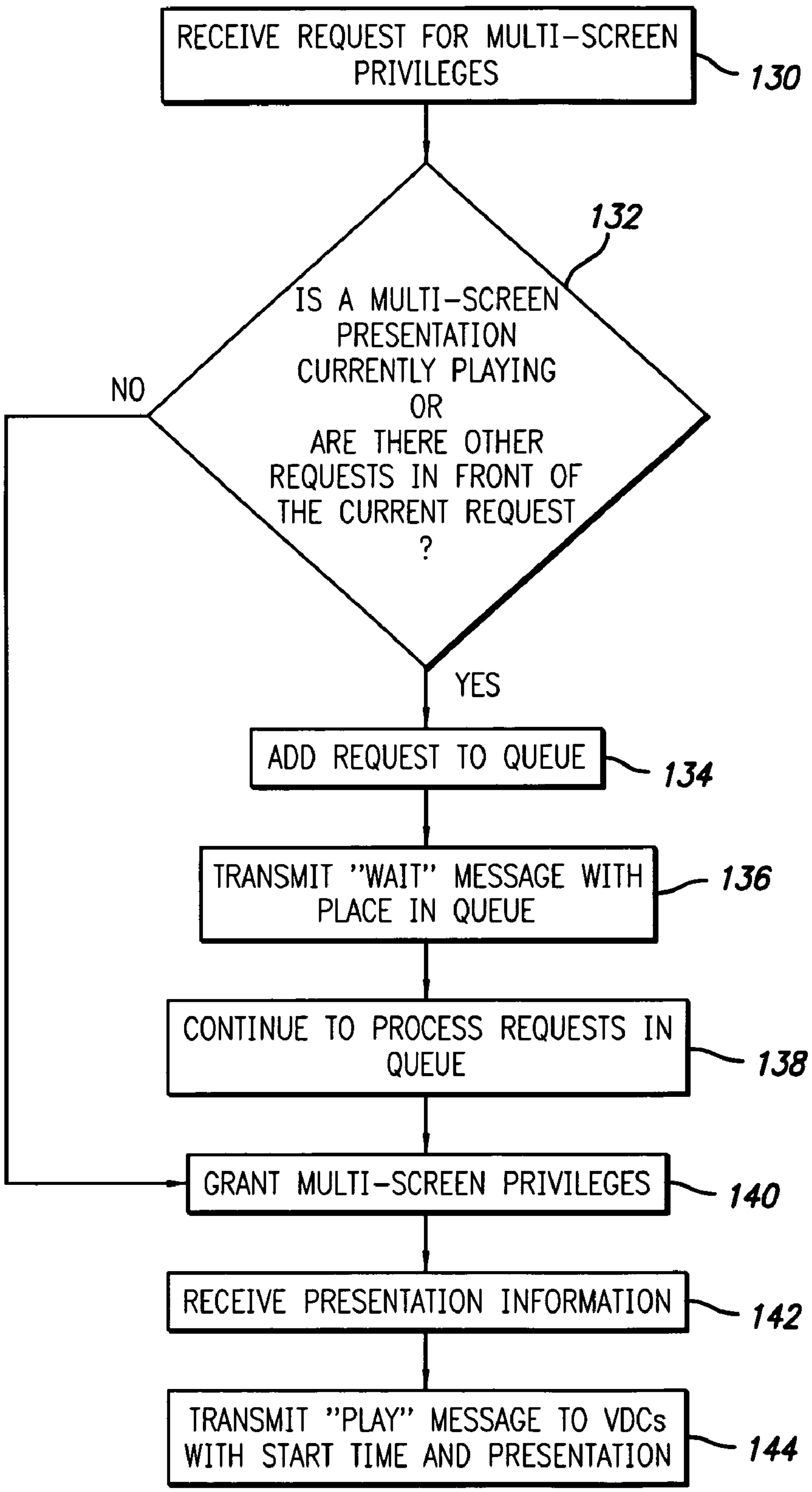
FIG. 6 is substantially a flow chart of one possible method of operation of the present invention.

In the preferred embodiment, one of VDCs 51–56 is designated a master VDC. The master VDC coordinates the VDCs to present global presentations. With reference to FIG. 6, when the master VDC receives a request for multi-screen privileges 130, it first determines if a multi-screen presentation is being presented or if there are other requests in front of the current request 132. If the answer is "no," the master VDC may grant multi-screen privileges 140. If the answer is "yes," the master VDC cannot grant multi-screen privileges and it places the request in a queue 134 and responds to requesting VDC 51 with a "wait" message along with other information, such as the requesting VDC's place in the queue 136.

The requesting VDC 51 may then transmit a wait message to GDC 46. At this point, GDC 46 and VDC 51 may present a message to the player on display device 22 that the player has won a bonus, that the bonus will be displayed shortly, and giving the players place in the queue.

Once the master VDC determines that the request can be granted 138, it sends a signal to the VDC 51 granting multi-screen privileges 140. GDC 46 and VDC 51 then inform the master VDC which presentation has been selected 142. The master VDC then transmits a "play" message to the relevant VDCs that informs the VDCs of the presentation to be presented and sets a starting time 144. Since each VDC plays its segment of the multi-screen presentation relatively independently, the start time must be synchronized among all of the VDCs. At the appointed start time, each VDC begins playing its segment of the integrated multi-screen presentation 112.

Once the multi-screen presentation is played, VDC 51 may request single-screen privileges 114 to play a single-screen presentation. A single-screen presentation, which may be presented on video display 22, may inform the player what has been won or present other information. Single-screen privileges may be granted in a way similar to the multi-screen privileges except that the master VDC determines that the intended screen is not in use and it will not be needed for a multi-screen presentation in the near future.

Once single-screen privileges are granted 116, the presentation is played and a prize may be awarded 118. To award a prize GDC 46 may transmit a signal to GC 41 to award the bonus to the player. The prize may be paid immediately or the prize amount may be added to the players credit meter.

Finally, GDC 46 and VDC 51 may display a presentation on display device 22 that entertains the player or attracts new players 120. Before this presentation is shown, however, the single or multi-screen privileges may need to be obtained before by the methods described above. Alternatively, if the player continues to play wagering device 12, GDC 46 and VDC 51 may display information that is relevant to the play of the game.

In the presentation embodiment illustrated in FIG. 4C, only two screens are need to display the presentation. If the presentation is displayed using game display 17, which may be a video display, and video display 22, then GDC 46 sends instructions to both VDC 51 and GC 41. GC 41 may then generate the presentation in game display 17. In this embodiment, GDC 46 performs a role similar to a master VDC in that it coordinates between the two display devices. This coordination may be performed, in part, by sending a "play" message with the presentation and start time to both VDC 51 and GC 41.

As mentioned above, the architecture may be simplified by integrating the GC 41, GDC 46, and VDC 51 into a single computer device. However, the architecture discussed herein can be adapted for use with many existing gaming devices with fully developed GCs. It is also to be understood that the methods described above are merely the presently preferred embodiment and that many other methods may be used to achieve the substantially the same results.

SUMMARY

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A gaming device video display system for displaying multi-screen presentations, the system comprising:

(A) a plurality of gaming devices, each gaming device being adapted to allow a player to play a wagering game, each gaming device being further adapted to select a multi-screen presentation and transmit a request for a multi-screen presentation;

(B) a plurality of video displays, each video display being adapted to display a video presentation, the video displays being positioned in close relative proximity to allow a video presentation to be displayed using the plurality of video displays, a portion of the video presentation being displayed on each of the video displays, wherein the video presentation appears to be an integrated, multi-screen presentation; and (C) a plurality of video display controllers, each video display controller being in communication with a gaming device, a video display, and other video display controllers, each video display being adapted to receive requests for multi-screen presentations from the gaming device with which it is in communication, the plurality of video display controllers being adapted to coordinate multi-screen presentations among the video display controllers, each video display controller being adapted to operate the video display with which it is in communication to present a portion of a multi-screen presentation.

2. The gaming device video display system of claim 1, wherein one of the plurality of video display controllers is a master video display controller, the master video display controller being adapted to receive requests for multi-screen video presentations, determine the availability of video displays, and grant multi-screen privileges.

3. The gaming device video display system of claim 1 wherein each gaming device comprises a game device controller, the game device controller being adapted to monitor the gaming device and transmit a request to a video display controller for a multi-screen presentation.

4. The gaming device video display system of claim 3 wherein the game device controller is adapted to select a multi-screen video presentation from a plurality of different presentations.

5. The gaming device video display system of claim 3 wherein the game device controller is adapted to select a bonus award and a multi-screen video presentation based on the output of a random number generator.

6. The gaming device video display system of claim 1 wherein each video display controller comprises memory, the memory being adapted to store video presentation data.

7. The gaming device video display system of claim 6 wherein each video display controller is adapted to store video presentation data for one segment of a multi-screen presentation.

8. The gaming device video display system of claim 1 wherein at least one of the gaming devices comprises a game display, the game display being adapted to display information, wherein the gaming device is adapted to display a presentation using both its video display and its game display.

* * * * *